Figure 1:
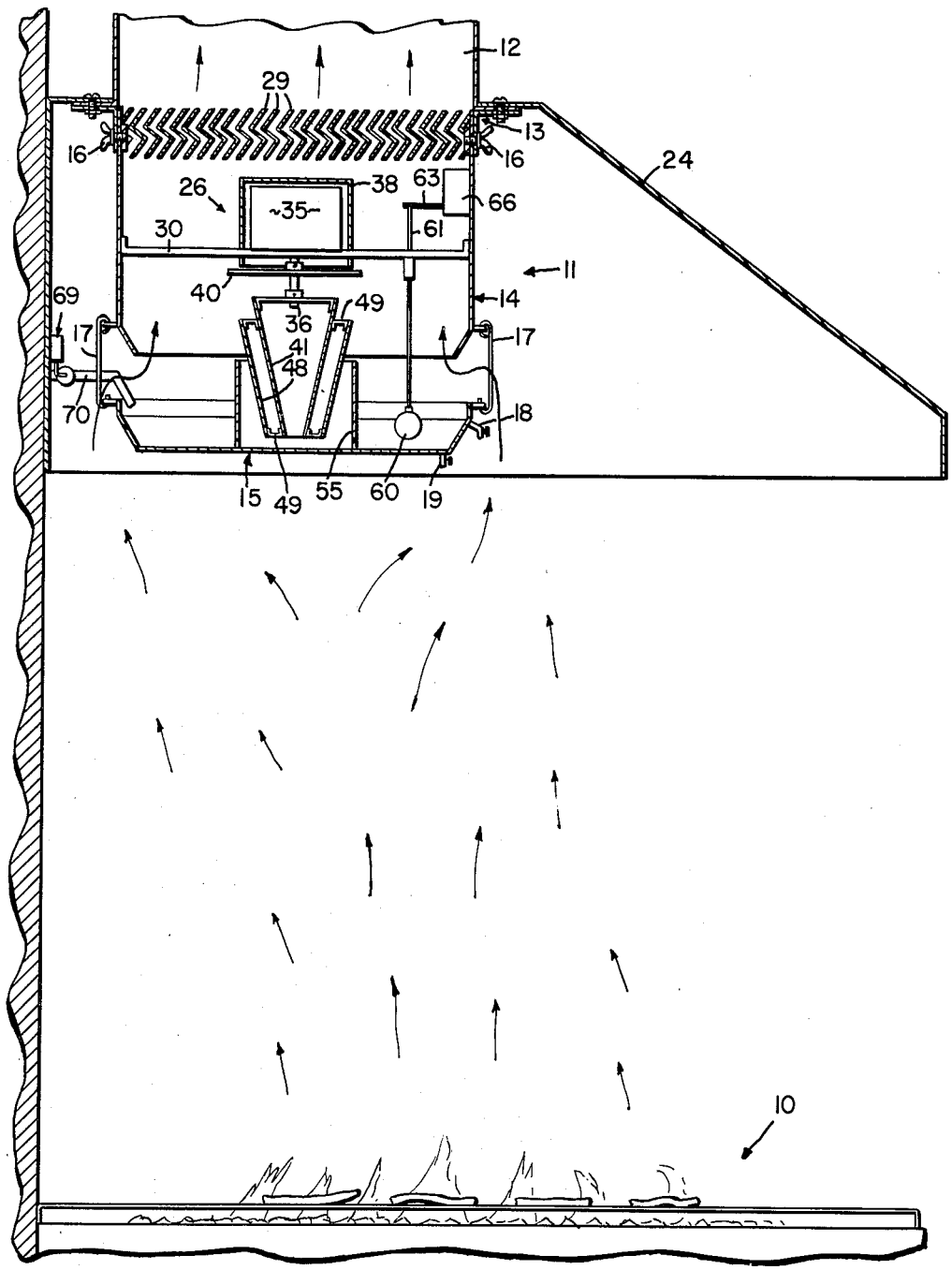

May 3, 1966 G. G. TOKE 3,248,858
GREASE EXTRACTING FILTER
Filed May 13, 1963 3 Sheets-Sheet 1

INVENTOR.
Gregory G. Toke
BY Wood, Herron & Evans
ATTORNEYS

May 3, 1966   G. G. TOKE   3,248,858
GREASE EXTRACTING FILTER
Filed May 13, 1963   3 Sheets-Sheet 3

INVENTOR.
BY Gregory G. Toke
Wood, Herron and Evans
ATTORNEYS

United States Patent Office 3,248,858
Patented May 3, 1966

3,248,858
GREASE EXTRACTING FILTER
Gregory G. Toke, 3766 Vine St., Cincinnati 17, Ohio
Filed May 13, 1963, Ser. No. 279,700
2 Claims. (Cl. 55—227)

This application relates to filters and more particularly to a filter for use over an oven hood.

In most commercial restaurants and hotels, etc. a ventilation system is utilized over ovens or grills to carry odorous gases and heat away from and out of the kitchen. While a ventilation system is desirable and necessary, it creates a hazardous fire condition. This condition derives from the fact that vaporized grease is also removed with the gases and collects in the ventilating ducts upon condensation and cooling. There it is often heated to the combustion points and starts a fire which in many cases results in complete destruction of the building since duct fires are very difficult to detect and put out before the fire is completely out of control.

Today most building codes and underwriter association regulations require a grease filter to be utilized between the oven and the entry to the ventilating duct. In most cases this filter is in the form of a wire screen located in the oven hood. It consists of closely spaced parallel wires approximately three inches in length and .005″ in diameter which form a mesh through which the gases must pass before entering the ventilating duct. Theoretically, the vaporized grease collects in these wire mesh filters which are cleaned approximately once a month. So long as it is cleaned regularly and remains much cooler than the gases the wire mesh filter is relatively effective. However, in most installations it is impossible to keep the filter cooler than the gases over an extended cooking period so that after an hour or two of cooking, the filter is approximately the same temperature as the gases, i.e., 150 to 300° F. Not only is it ineffective at these temperatures, it is then also a nuisance in so far as the cooks are concerned because grease drips from the filter onto the head and arms of a cook working over the stove or oven.

The additional fire hazard created by the hot filter results from the fact that it is generally located some three or four feet over the stove. Fires which break out on the grilling surface of the stove ignite the grease in the filter which in turn ignites the grease in the ventilating duct. The filters are generally removable for cleaning purposes so that after the fire in the filter has been put out, it is removed and the ventilating ducts inspected to determine whether the fire has spread back into the ventilating ducts. Oftentimes the fire is then in the ducts but goes undetected until after a major fire is spreading throughout the building.

Oven or grill fires are relatively common occurrences in restaurants. In many commercial installations they occur as often as five or ten times a week and may ignite the filter as often as once or twice a month. Needless to say this is an extremely hazardous condition and one that has remained unsolved to date. Various attempts have been made to obviate this condition such as locating an automatic fire extinguisher sprinkler system in the ventilating ducts. One other proposal which has not yet received wide commercial acceptance has been to pass the oven gases through a gas heater where the vaporized grease is eliminated by burning or complete oxidation. Needless to say this latter proposal is not only expensive since it consumes large amounts of gas, but creates additional heat in an already hot kitchen.

An objective of this invention has been to provide an improved grease removing filter for use over an oven or grill to prevent fires in a ventilating system.

Another objective of this invention has been to eliminate or remove vaporized grease from oven gases before the gases enter the ventilating duct. Applicant has discovered that the vaporized grease may be caused to coalesce if passed through a water mist and the grease droplets may then easily be removed without creating any hazardous fire conditions. The water mist not only causes coalescence of the grease but also cools the oven gases before they enter the ventilating ducts and thus completely eliminates any possibility of fires in the duct work.

Still another objective of this invention has been to provide an inexpensive filter for removing vaporized grease from oven gases which may be easily cleaned and from which the collected grease may be easily removed. To this end the grease collecting tray is removable from the filter so that it may be quickly drained and placed in a commercial dishwasher for cleaning. Similarly the filter housing is removable for cleaning purposes.

Still another objective of this invention has been to provide an improved apparatus for creating a water mist through which gases may be passed to remove vaporized grease. This invention incorporates an inverted truncated cone which when rotated at very high speeds, such as 3500 r.p.m. pulls the water up through the cone and along its outside walls and sprays it outwardly over the top edge in the form of a very fine water mist.

Figure 2:
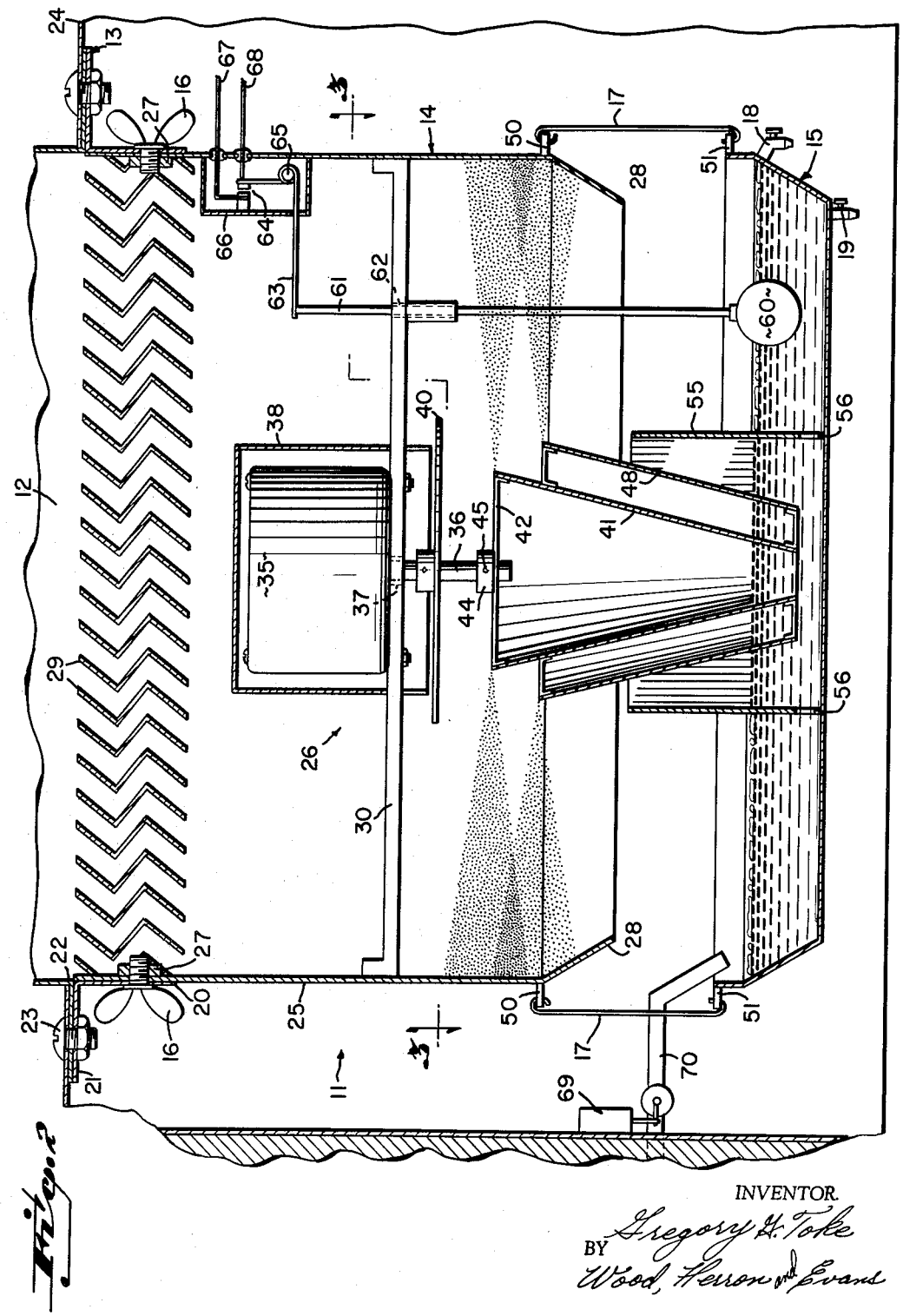
Figure 3:
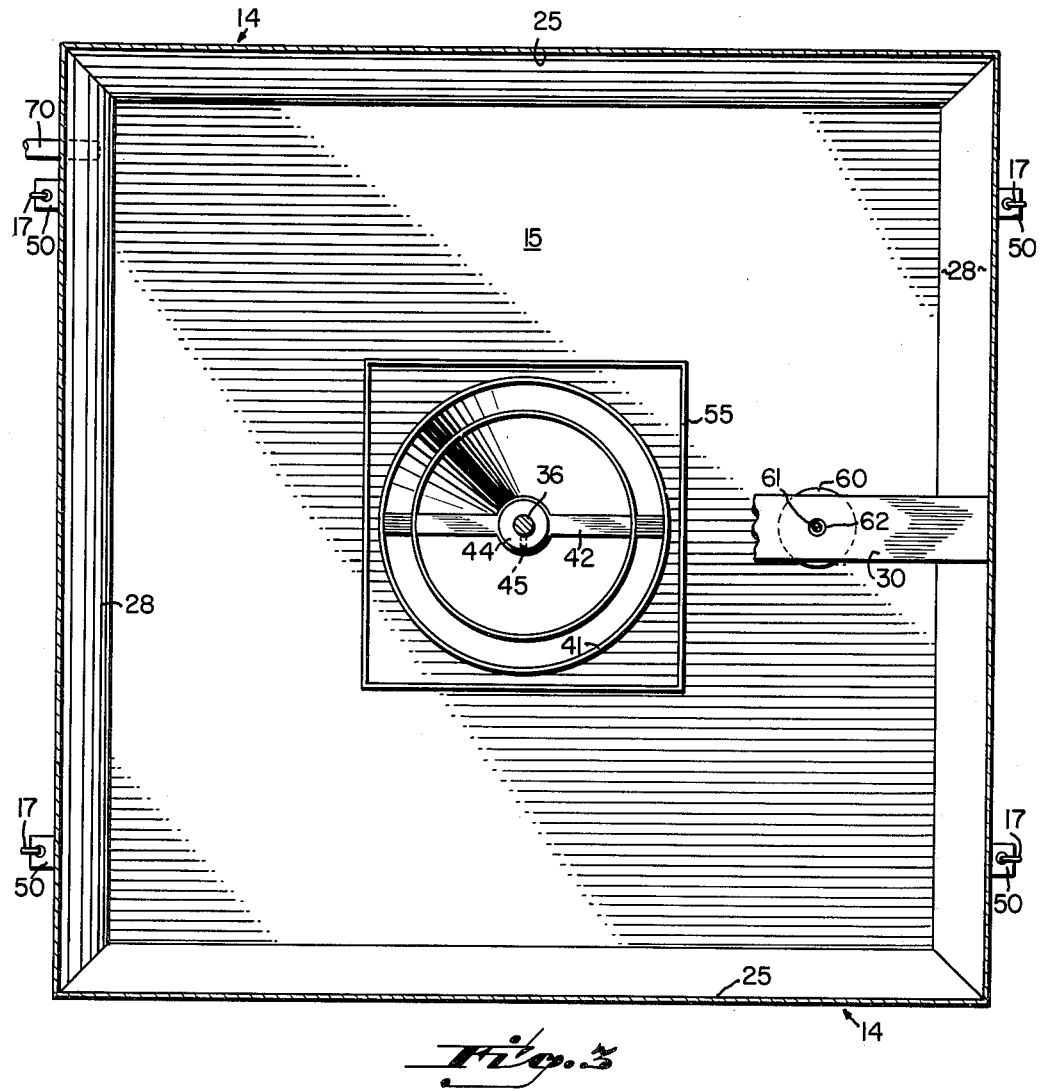

These and other objectives and advantages of the invention will be more readily apparent from a description of the drawings in which:

FIGURE 1 is a diagrammatic view of a stove and filtering hood arrangement showing the grease collecting filter in cross section, FIGURE 2 is an enlarged cross sectional view of the grease collecting filter, FIGURE 3 is a cross sectional view taken along line 3—3 of FIGURE 2.

Referring to FIGURE 1, it will be seen that the oven or stove gases pass from the top of the stove 10 upwardly through the grease collecting filter 11 into the conventional ventilating duct 12. The duct is equipped with the usual fan (not shown) by which oven gases are pulled out of the kitchen and forced out of the building.

The filter consists of three sections: an adapter 13 which is permanently attached to the ventilation duct 12, a filter housing 14, and a water reservoir and grease collecting tray 15. The adapter 13 is designed so as to be permanently attached to the ventilation duct. To facilitate installation, cleaning or repair, the housing is removably attached to the adapter by a pair of wing nuts 16. The water reservoir and grease collecting tray 15 is removably secured to the housing by means of four suspension hooks 17 so that the tray may easily be removed and cleaned. The tray 15 also has an upper drain cock 18 by means of which collected grease may be removed from the tray and a lower drain cock 19 for draining water from the tray.

The adapter 13 consists of a rectangular tubular section 20 which has a horizontal flange 21 extending outwardly from its upper peripheral surface. The flange 21 is attached to a bottom flange 22 of the ventilating duct 12 by means of a plurality of nuts and bolts 23. Attachment of the adapter to the conventional ventilating duct involves only drilling suitable holes in the bottom flange of the ventilating duct and connecting the adapter to the duct by means of any conventional fastener. The ventilating duct may have a hood 24 extending outwardly over the stove as is usual in most kitchen ventilating systems.

The housing 14 consists of a rectangular shield 25 within which is mounted a spray or misting device 26. Shield 25 is generally tubular and of approximately the same cross sectional shape and size as the adapter 13. It telescopes within the adapter and is connected by a pair of wing nuts 16 threaded into threaded embossments 27 attached to the inner surface of the shield.

The bottom portion 28 of the shield tapers inwardly so that water directed against the walls of the shield flows along the inside wall of the tapered portion and is directed into the tray 15 suspended from the housing. Adjacent its upper surface the housing has a plurality of baffles 29 extending laterally between two of the side walls. The baffles are generally Z-shaped in cross section and are interfitted in spaced but overlapping relationship so that air passing through the baffles is forced to travel a circuitous route. Any water vapor in the gases thus tends to condense out on the baffles and drain back into the housing 14.

The spray or misting device 26 is attached to a bracket 30 extending transversely between two opposite inside walls of the shield 25 to which it is welded, bolted or otherwise permanently fastened by this type of connector. To create the spray mist, a truncated tubular cone having the small end extending into a water reservoir is rotated very rapidly, as for example 3500 r.p.m. Rapid rotation of the cone creates a vacuum or low pressure area along the cone wall so that water is drawn up along the inside and outside wall surfaces. The water is then thrown outwardly over the upper wall surface in the form of a very fine spray mist. In the preferred embodiment, a double cone arrangement is utilized with a consequent increase in the amount of misted water sprayed outwardly through which the oven gases must pass. When the oven gases having vaporized grease therein pass through the water mist, the vaporized grease coalesces and drops out of the gases in the form of droplets which are collected in the tray 15. This type of spray device is particularly advantageous in this environment since there is no tendency for the grease to clog up the spraying device.

The spray misting device 26 is attached to a bracket 30 extending transversely between two opposite inside walls of the shield 25 to which it is welded or otherwise permanently fastened. The motor 35 which drives the spraying device is mounted upon the top of the bracket 30 with its shaft 36 extending downwardly through an aperture 37. A protective shield 38 in the form of an open bottom box surrounds the motor to protect it against the corrosive effect of the water mist. Additionally, a disc shaped spray deflector 40 is attached to the shaft 36 a slight distance below the bottom of the motor shield 38 so as to protect the motor against the water spray and increase the effectiveness of the device since any mist or spray which contacts the deflector 40 is also thrown outwardly to increase the amount of water mist through which the gases must pass before entering the ventilation duct.

The truncated cone 41 which acts as a pump and spray misting device is attached to the motor shaft 36 by means of a bracket 42 which extends across the upper surface of the cone. At its lateral extremities the bracket extends downwardly and inwardly into the inner surface of the cone and is welded thereto. The bracket has a sleeve 44 attached along the axis of the cone through which the motor shaft 36 extends. It is attached to the shaft 36 by means of a set screw 45 extending radially through the sleeve 44 so that the cone 41 is suspended from the shaft. A second inverted tubular truncated cone 48 is attached to the outer wall of the truncated cone 41 by means of C-shaped brackets 49. The upper surface of the outer cone 48 is located below the upper surface of the inner cone 41 so that water mist thrown outwardly over the top of the outer cone is directed in a horizontal plane located below the mist thrown outwardly by the inner cone. The lower surfaces of both cones are located in approximately the same horizontal plane.

The water reservoir and grease collecting tray 15 is suspended from the housing 14 by means of four suspension hooks 17, one hook being located on each side of the rectangular tray. The upper end of each hook is attached to a protrusion 50 on each side of the housing. The lower end of each hook has a J-bend therein which extends through an aperture of a protrusion or flange 51 extending outwardly from the upper surface of the tray. To remove the tray, it is lifted and removed from the suspension hook. Thus the tray may be quickly and easily removed for purposes of cleaning. While any type of releasable clamp is suitable for securing the tray to the housing this type of connection is preferred since it minimizes vibrational noise between the housing and tray. The length of the hook 17 should be such that a gap is provided between the bottom of the housing 14 and the top of the tray. The total area of this gap should be approximately equal to the cross sectional area of the ventilation duct 12 in order to maximize the flow of gases through the filter device and thus maximize the efficiency of the filter.

The tray 15 has a pair of drain cocks 18, 19 by means of which grease may be drained off the top surface of water within the tray and water may be drained from the tray before removing and cleaning it. The grease drain cock 18 is located at the water line of the tray approximately one-half inch below the top surface. Since grease floats on water, all of the grease in the tray will be located on the top of the water and may be easily drained off by merely opening the drain cock 18. When the tray is to be cleaned, the water is drained from the tray by opening the drain cock 19 located in the bottom of the tray. Thus the person cleaning the tray does not have to worry about spilling water while removing the tray.

To prevent grease from being drawn up through the cones and sprayed outwardly with the water, a grease obstruction shield 55 extends upwardly from the bottom of the tray. The shield 55 surrounds the outer cone 48. It has apertures 56 located adjacent its bottom edge through which water passes from the lateral extremities of the tray within the shield 55. Thus the grease which floats on top of the water is prevented from entering within the shield 55 and being sprayed outwardly through the spraying device.

This invention also incorporates means to maintain a proper water level within the tray 15. To this end a float 60 is located in the water within the tray and has a stem 61 extending upwardly through an aperture 62 in the bracket 30. The end of the stem 61 engages a switch actuator 63 of a normally open switch 64. Switch actuator 63 is generally L-shaped and is pivotable about a pivot pin 65 mounted within a casing 66 attached to the inside wall of the housing 14. When the water falls below a predetermined level, the flotation bulb 60 is lowered causing the switch actuator 63 to close the switch 64. Closing of the switch 64 closes a circuit through leads 67, 68 to a conventional solenoid actuated valve 69. Energization of the valve 69 opens a water conduit 70 the end of which extends over the water reservoir within the tray 15. Thus the water level within the tray is always maintained at a fixed level irrespective of the amount of evaporation caused by the heat from the stove or oven.

In operation, water is pumped upwardly by the cones 41, 48 which are rotating at a speed of approximately 3500 r.p.m. At these speeds water is thrown outwardly over the top edges of the cone in the form of a very fine mist. The oven gases including the vaporized grease are pulled upwardly by the fan within the ventilation duct and thus are forced through the gap or space between the top surface of the tray 15 and the bottom surface of the housing 14. These gases pass through the water mist and into the duct. While passing through the water mist the gases are cooled and the grease coalesces and falls into the tray 15 in the form of droplets where it floats on top of the water. Since the oven gases entering the hood range in temperature from approximately 150° to 300° F., there is a very high evaporation rate of the water. However, most of the water collects on the baffles 29 where it condenses and drops back into the housing and into the tray. The water level within the tray is maintained by the electrically actuated valve 69 at a proper level so that there is always a mist through which the oven gases must pass before entering the ventilation duct. Thus any propensity for the gases to collect in the ventilating duct and there start a fire is eliminated by the removal of the grease vapor from the gases and by the cooling of the gases as they pass through the water mist before entering the duct.

Having described my invention, I claim:

1. In combination with a kitchen ventilating exhaust duct and hood, a grease extracting spray means comprising, an adapter member having means thereon for connection to the lower end of the exhaust duct beneath said hood, a generally tubular housing having an open bottom through which cooking gases enter the housing and an open upper end through which gases leave the housing and enter the said exhaust duct, said housing including means thereon for connecting said housing to said adapter member, a water reservoir tray removably suspended from and in spaced relation to said open bottom of said housing, water misting means mounted within said housing for creating a water mist curtain within said housing between said open bottom and said open upper end whereby vaporized grease contained in the cooking gases passed through said mist is caused to coalesce, collect in droplets, and drop into said water reservoir tray, said misting means including a rotatable, truncated, conical member having its smaller end extending into said reservoir tray for withdrawing water therefrom for creation of said water mist curtain.

2. The combination of claim 1 further including automatic regulation means attached to said housing for maintaining a water reservoir at a predetermined level within said reservoir tray.

References Cited by the Examiner

UNITED STATES PATENTS

| | | | |
|---|---|---|---|
| 1,650,152 | 11/1927 | Perry | 261—91 |
| 1,835,559 | 12/1931 | Cutler | 261—91 |
| 2,122,334 | 6/1938 | Asbury | 261—91 |
| 2,234,735 | 3/1941 | Lambert et al. | 55—258 X |
| 2,554,867 | 5/1951 | Mills | 261—91 X |
| 2,766,027 | 10/1956 | Herr | 261—91 |
| 2,793,712 | 5/1957 | Graswich et al. | 55—404 |
| 3,055,645 | 9/1962 | Feldermann | 261—91 X |
| 3,100,809 | 8/1963 | Baker | 261—117 X |

HARRY B. THORNTON, *Primary Examiner.*

T. R. MILES, L. H. McCARTER, *Assistant Examiners.*